Patented Apr. 6, 1926.

1,580,012

UNITED STATES PATENT OFFICE.

JÜRGEN CALLSEN, OF ELBERFELD, GERMANY, ASSIGNOR TO WINTHROP CHEMICAL COMPANY, INC., OF NEW YORK, N. Y.

CHOLINE COMPOUND HAVING LAXATIVE PROPERTIES.

No Drawing.   Application filed May 11, 1925. Serial No. 29,624.

*To all whom it may concern:*

Be it known that I, JÜRGEN CALLSEN, a citizen of Germany, residing at Elberfeld, in the State of Prussia, Germany, have invented new and useful Improvements in Choline Compounds Having Laxative Properties, of which the following is a specification.

In United States Letters Patent No. 1,518,689 a process is protected for the manufacture of new compounds, possessing a definite arecolin effect.

The subject of the present invention is to obtain preparations having a considerably increased effect by acylation of the oxalkyl nucleus. The process consists in introducing into the hydroxyl group of the intermediate products mentioned in the above patent, acyl nuclei and adding on an alkylating agent or in acylating the quaternary compounds.

The new products have proved to be valuable pharmaceutical compounds possessing the action of the alcaloid arecolin. They are laxatives which can be used for subcutaneous injections.

They are in the shape of their salts e. g. bromide, iodide, nitrate, which salts retain the valuable properties of the bases whitish crystalline compounds soluble in water and alcohol.

In order to more fully describe the invention the following examples are given:—

*Example 1.*—Equal parts by weight of dimethylaminoethylglycol and acetic anhydride are mixed. An extremely vigorous reaction ensues with the evolution of heat. The product is distilled in vacuo and the acetyldimethylaminoethylglycol is obtained as an almost colorless liquid with a boiling point of 103–108° at 27 mm.

175 parts by weight of acetyldimethylaminoethylglycol are introduced into 500 parts by weight of a 20% solution of methylbromide in benzol. The separation of the addition product occurs very rapidly. The crystals are filtered off and purified by recrystallization from alcohol, if necessary with the addition of a little ether.

Acetyloxyethylether - trimethylammonium bromide forms a white crystalline powder, easily soluble in water and alcohol and almost insoluble in ether.

The substance is hygroscopic and owing to this fact the melting point is a little indefinite, lying between about 126 and 128°.

*Example 2.*—100 parts by weight of oxyethyl-ether-trimethylammonium bromide are moistened with 200 parts by weight of acetyl chloride. Solution takes place and the reaction starts almost at once with the evolution of heat. In order to complete the reaction the product is heated under reflux for a short time on the steam bath. The excess of acetyl chloride is then distilled off and the residue which, on cooling, solidifies to crystals, is purified by recrystallization from alcohol with the addition of a little ether. The acetyl oxyethyl-ether-trimethylammonium bromide is obtained, possessing the properties described in example 1.

*Example 3.*—175 parts by weight of the acetyldimethylaminoethylglycol described in example 1 are dissolved in 800 parts by weight of benzol and treated with 142 parts by weight of methyl iodide. After some time the product of addition separates and is purified after filtration by recrystallization from hot alcohol.

The acetyloxyethylether - trimethylammonium iodide is obtained in almost colorless crystals which dissolve easily in alcohol and water, but are almost completely insoluble in petrolether and ether. The melting point is about 124°.

The anhydride or chloride of acetic acid may be replaced by the corresponding derivatives of other acids, when the respective acyl nuclei may be introduced in a quite analogous manner.

I claim:—

1. Process for the manufacture of derivatives of basic acyloxyalkylethers, which process consists in acylating the compounds obtainable by treating aliphatic alkamines with alkylene glycols and adding on alkylating agents to the acylated bases thus obtained.

2. Process for the manufacture of derivatives of basic acyloxyalkylethers, which process consists in treating oxyalkylether trialkylammonium halides with acylating agents and isolating the resulting products.

3. As new products, choline compounds in which the hydrogen of the hydroxyethyl group of choline and its derivatives is replaced by an acylated hydroxyalkyl radicle the salts of the compound being whitish crystalline materials soluble in water and alcohol and valuable laxatives capable of subcutaneous injection.

4. As a new product a choline compound being chemically the acetyloxyethylether-trimethylammonium bromide having most probably the formula $$CH_3-COO-CH_2-CH_2-O-CH_2-CH_2-\underset{\underset{Br}{|}}{N}(CH_3)_3$$

being a white crystalline powder easily soluble in water and alcohol, almost insoluble in ether melting at about between 126 and 128° C. and being a valuable laxative for subcutaneous use, substantially as described.

In testimony whereof I have hereunto set my hand.

JÜRGEN CALLSEN.